United States Patent
Wang et al.

(10) Patent No.: US 11,465,249 B2
(45) Date of Patent: Oct. 11, 2022

(54) SELF-CENTERING DEVICE FOR CYLINDER LINER PRESS-FIT WHEEL

(71) Applicant: CITIC Dicastal Co., Ltd., Qinhuangdao (CN)

(72) Inventors: Jun Wang, Qinhuangdao (CN); Xiao Liu, Qinhuangdao (CN); Xiaopeng Chen, Qinhuangdao (CN); Xingming Zhang, Qinhuangdao (CN); Zuo Xu, Qinhuangdao (CN); Hanqi Wu, Qinhuangdao (CN)

(73) Assignee: CITIC DICASTAL CO., LTD., Qinhuangdao (CN)

( * ) Notice: Subject to any disclaimer, the term of this patent is extended or adjusted under 35 U.S.C. 154(b) by 0 days.

(21) Appl. No.: 17/387,972

(22) Filed: Jul. 28, 2021

(65) Prior Publication Data
US 2022/0168854 A1 Jun. 2, 2022

(30) Foreign Application Priority Data

Dec. 2, 2020 (CN) .......................... 202022850086.0

(51) Int. Cl.
*B23P 19/027* (2006.01)
*B30B 15/00* (2006.01)
*B23P 19/00* (2006.01)

(52) U.S. Cl.
CPC ........... *B23P 19/027* (2013.01); *B23P 19/002* (2013.01); *B30B 15/0052* (2013.01)

(58) Field of Classification Search
CPC ......... B23P 19/027; B23P 19/10; B23P 19/12; B23P 19/102; B23P 19/02; B30B 15/0052

USPC .............................. 29/281.3, 281.1, 245, 271
See application file for complete search history.

(56) References Cited

U.S. PATENT DOCUMENTS

| 2,994,131 | A | * | 8/1961 | Gaylord | B23B 51/10 33/642 |
| 3,241,243 | A | * | 3/1966 | Speer | G01B 7/012 33/503 |
| 4,098,001 | A | * | 7/1978 | Watson | B25J 17/0208 901/45 |
| 4,155,169 | A | * | 5/1979 | Drake | B23P 19/12 901/45 |
| 4,242,017 | A | * | 12/1980 | De Fazio | B23Q 35/02 901/41 |
| 4,283,153 | A | * | 8/1981 | Brendamour | B23P 19/102 403/53 |
| 4,320,674 | A | * | 3/1982 | Ito | B25B 23/10 81/125 |
| 4,355,469 | A | * | 10/1982 | Nevins | G01B 5/25 901/45 |
| 4,367,591 | A | * | 1/1983 | Hirabayashi | B23P 19/12 901/45 |
| 4,400,885 | A | * | 8/1983 | Consales | B23P 19/102 901/45 |
| 4,439,926 | A | * | 4/1984 | Whitney | B23P 19/12 901/45 |
| 4,485,562 | A | * | 12/1984 | De Fazio | B25J 17/0208 33/520 |

(Continued)

*Primary Examiner* — Jason L Vaughan
(74) *Attorney, Agent, or Firm* — IPro, PLLC

(57) ABSTRACT

A self-centering device for a liner press-fit wheel may improve center alignment when liners are pressed in bolt holes of the wheel, may reduce rejects generated when bolt hole materials are pressed out by alignment failures, and may improve a press-fit yield.

9 Claims, 2 Drawing Sheets

(56) References Cited

U.S. PATENT DOCUMENTS

| | | | | |
|---|---|---|---|---|
| 4,537,557 A * | 8/1985 | Whitney | ............. | B25J 15/0206 |
| | | | | 901/45 |
| 4,627,169 A * | 12/1986 | Zafred | ................... | B23Q 1/36 |
| | | | | 33/642 |
| 4,661,037 A * | 4/1987 | Sugino | ................ | B25J 17/0208 |
| | | | | 901/45 |
| 4,803,786 A * | 2/1989 | Cusack | ............... | B25J 17/0208 |
| | | | | 33/644 |
| 4,848,757 A * | 7/1989 | De Fazio | ............... | F16F 15/02 |
| | | | | 901/45 |
| 5,396,714 A * | 3/1995 | Sturges, Jr. | ............. | G01B 5/25 |
| | | | | 901/45 |
| 6,408,531 B1 * | 6/2002 | Schimmels | ......... | B25J 17/0208 |
| | | | | 33/644 |
| 7,748,136 B2 * | 7/2010 | Joo | ...................... | B23P 19/105 |
| | | | | 33/644 |
| 11,219,975 B2 * | 1/2022 | Bullock | ................. | B23P 19/06 |

\* cited by examiner

SELF-CENTERING DEVICE FOR CYLINDER LINER PRESS-FIT WHEEL

FIELD

The present disclosure relates to the technical field of wheel assembly, in particular to a self-centering device for a cylinder liner press-fit wheel.

BACKGROUND

Some wheel products need press-fit of cylinder liners at positions of bolt holes after machining ends, and thus cylinder liners are firmly assembled in the bolt holes by interference fit. However, in the presence of machining errors, it is impossible to place a plurality of bolts holes of each wheel at theoretically exact places. Slight errors may always present within an allowable range of deviation in the drawings, in addition to that, there are always certain errors present on a positioning fixture on a press for cylinder liner assembly, due to the comprehensive effect of various errors in a whole assembly process system for wheels, certain offset presents between the axes of cylinder liners and the axes of the bolt holes of the wheel when cylinder liners of some cylinder liner press-fit products are pressed in wheels, as a result, uneven interference is generated between the cylinder liners and the bolt holes, i.e., interference in some positions is slightly large and interference in some other positions is slightly small. Those positions with large interference may usually press bolt hole inner wall materials out of bolt holes to cause some small bulges on flange faces of wheels, and therefore requirements of the flange faces of the wheels on flatness and inward indentation are not met, and the mounting and assembling effect of a whole vehicle is affected.

SUMMARY

For this purpose, the present disclosure aims to provide a self-centering device for a cylinder liner press-fit wheel, to realize self-adaptive alignment of axes of the cylinder liners and axes of the bolt holes of the wheel when cylinder liners are pressed in bolt holes of the wheel. To make the purpose, the technical solution of the present disclosure is implemented as follows:

The self-centering device for the cylinder liner press-fit wheel includes a rack, wherein a bottom plate is disposed at the bottom of the rack, a top plate is disposed on the top of the rack, a flat plate is disposed on the bottom plate, self-centering systems are disposed on the flat plate, each self-centering system includes a positioning column elastically connected to the flat plate, the positioning columns can move relative to the flat plate in an up-down direction, a left-right direction and a front-back direction, hydraulic cylinders are disposed on the top plate, and hollow pressing columns are connected downwards to the output ends of the hydraulic cylinders at the positions corresponding to the positioning columns.

In some embodiments, each self-centering system includes a shaft sleeve disposed on the flat plate, a positioning column is disposed in a gap in the middle of each shaft sleeve, and the bottom of each positioning column is connected to the corresponding shaft sleeve through compression springs.

In some embodiments, each positioning column is connected to the corresponding shaft sleeve through compression springs in forwards, backwards, leftwards and rightwards directions correspondingly.

In some embodiments, a floating block is disposed between each positioning column and the corresponding compression spring.

In some embodiments, a cover plate is disposed on the lower portion of each shaft sleeve, and the bottom of each positioning column is connected to the corresponding cover plate through a corresponding compression spring.

In some embodiments, the bottom plate is fixedly connected to the flat plate through supports.

In some embodiments, the output ends of the hydraulic cylinders are fixedly connected to the hollow pressing columns through a connecting plate.

In some embodiments, the number of the self-centering systems and the number of the bolt holes of the wheel are matched.

In some embodiments, the number of the hollow pressing columns and the number of the self-centering systems are matched.

Compared with the prior art, the self-centering device for the cylinder liner press-fit wheel has the following advantages:

The solution provided by the present disclosure may improve center alignment when cylinder liners are pressed in bolt holes of the wheel, may reduce rejects generated when bolt hole materials are pressed out by alignment failures, and may improve a press-fit yield.

BRIEF DESCRIPTION OF THE DRAWINGS

The accompanying drawings as one part of the present disclosure provide a further understanding of the present disclosure, and exemplary embodiments of the present disclosure and description thereof are provided to interpret the present disclosure, but not to improperly limit the present disclosure. In the accompanying drawings.

DESCRIPTION OF REFERENCE NUMERALS

Figure 1:
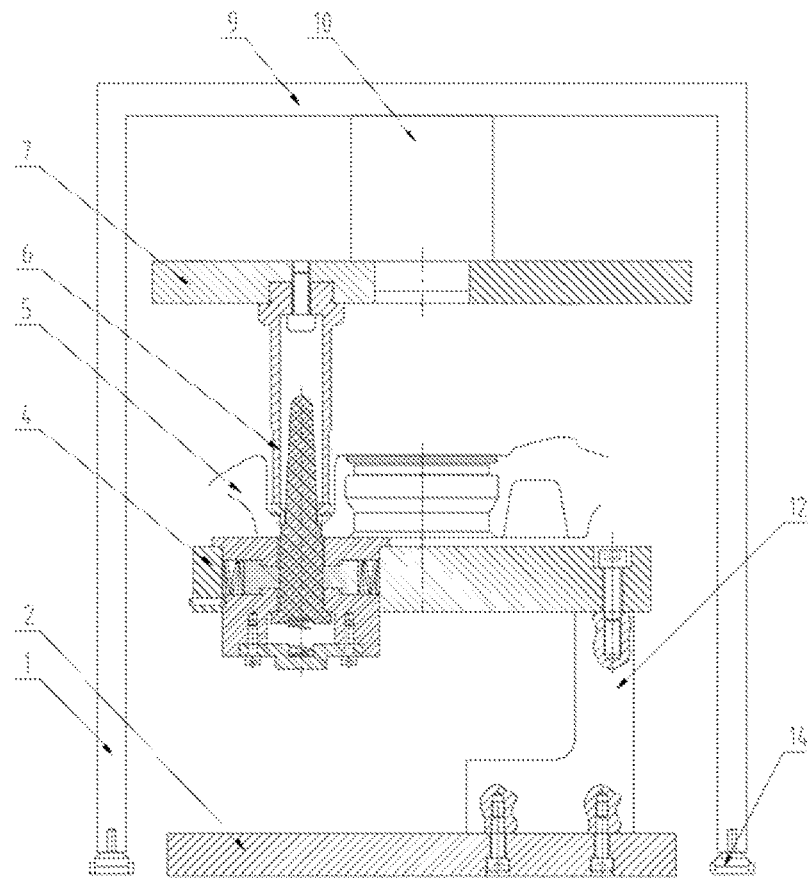
FIG. 1 is a front view of a self-centering device for a cylinder liner press-fit wheel of the present disclosure.

1—Stand column, 2—Bottom plate, 4—Flat plate, 5—Wheel, 6—Hollow pressing column, 7—Connecting plate, 9—Top plate, 10—Hydraulic cylinder, 12—Support, 14—Foundation, 16—Cover plate, 18—Shaft sleeve, 19—Cylinder liner, 20—Positioning column, and 21—Floating block.

DETAILED DESCRIPTION OF THE EMBODIMENTS

It should be illustrated that the embodiments of the present disclosure and features in the embodiments may be combined with each other under no conflicts.

The technical solutions of the present disclosure will be clearly and comprehensively described as below by reference to the accompanying drawings in conjunction with the embodiments. Obviously, the embodiments as described herein are only part of the embodiments of the present disclosure, but not to represent all the embodiments. All other embodiments that those of ordinary skill in the art may acquire without making creative efforts all belong to the protection scope of the present disclosure.

A self-centering device for a cylinder liner press-fit wheel of the embodiments of the present disclosure is described in conjunction with the embodiments by reference to FIG. 1-4 as below.

The self-centering device for the cylinder liner press-fit wheel includes a rack, wherein a bottom plate 2 is disposed at the bottom of the rack, a top plate 9 is disposed on the top of the rack, a flat plate 4 is disposed on the bottom plate 2, self-centering systems are disposed on the flat plate 4, each self-centering system includes a positioning column 20 elastically connected to the flat plate 4, the positioning columns 20 may move relative to the flat plate 4 in an up-down direction, a left-right direction and a front-back direction, hydraulic cylinders 10 are disposed on the top plate 9, and hollow pressing columns 6 are connected downwards to the output ends of the hydraulic cylinders 10 at the positions corresponding to the positioning columns 20.

Each self-centering system includes a shaft sleeve 18 disposed on the flat plate 4, a positioning column 20 is disposed in a gap in the middle of each shaft sleeve 18, and the bottom of each positioning column 20 is connected to the corresponding shaft sleeve 18 through compression springs. Each positioning column 20 is connected to the corresponding shaft sleeve 18 through compression springs in forwards, backwards, leftwards and rightwards directions correspondingly. A floating block is disposed between each positioning column 20 and the corresponding compression spring. A cover plate 16 is disposed on the lower portion of each shaft sleeve 18, and the bottom of each positioning column 20 is connected to the corresponding cover plate 16 through a corresponding compression spring. The bottom plate 2 is fixedly connected to the flat plate 4 through supports 12. The output ends of the hydraulic cylinders 10 are fixedly connected to the hollow pressing columns 6 through a connecting plate 7. The number of the self-centering systems and the number of the bolt holes of the wheel are matched. The number of the hollow pressing columns 6 and the number of the self-centering systems are matched.

In one embodiment, the self-centering device for the cylinder liner press-fit wheel includes the stand columns 1, the bottom plate 2, the flat plate 4, the wheel 5, the hollow pressing columns 6, the connecting plate 7, the top plate 9, the hydraulic cylinder 10, the supports 12, foundations 14, the cover plates 16, the shaft sleeves 18, the cylinder liners 19, the positioning columns 20, the floating blocks 21, etc.

The rack further includes the four stand columns 1 that are symmetrically distributed, a foundation 14 is disposed at the lower end of each stand column 1, the top plate 9 is fixedly disposed at the top ends of the four stand columns 1, the hydraulic cylinder 10 is disposed in the middle of the lower surface of the top plate 9, the connecting plate 7 is disposed at the output end of the hydraulic cylinder 10, the hollow pressing columns 6 are fixed to the lower end of the connecting plate 7 through screws, and the hollow pressing columns 6 and the bolt holes of the wheel are the same in number and pitch size.

In the self-centering systems, the lower end of each support 12 is fixed to the bottom plate 2 through two screws, the number of the supports 12 and the number of the bolt holes of the wheel are the same, the upper surfaces of the plurality of supports 12 are fixedly connected to the flat plate 4 through a plurality of screws, the shaft sleeves 18 are positioned in through holes in the flat plate 4 through set screws by a relatively small clearance fit, the four floating blocks 21 are symmetrically disposed in holes in the periphery of each shaft sleeve 18, the four compression springs are disposed behind the four floating blocks 21 correspondingly, the positioning columns 20 are put into the self-centering systems from the lower sides of the shaft sleeves 18, each cover plate 16 is fixedly disposed on the lower side of the corresponding shaft sleeve 18 through a plurality of screws, and the compression springs are disposed in a space between each positioning column 20 and the corresponding cover plate 16.

Figure 2:
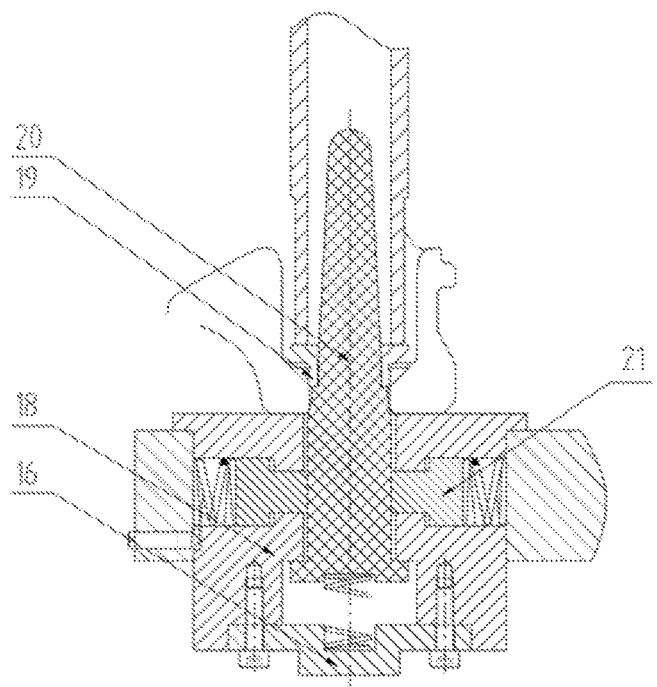
FIG. 2 is a front view of each self-centering system of the self-centering device for the cylinder liner press-fit wheel of the present disclosure.
Figure 3:
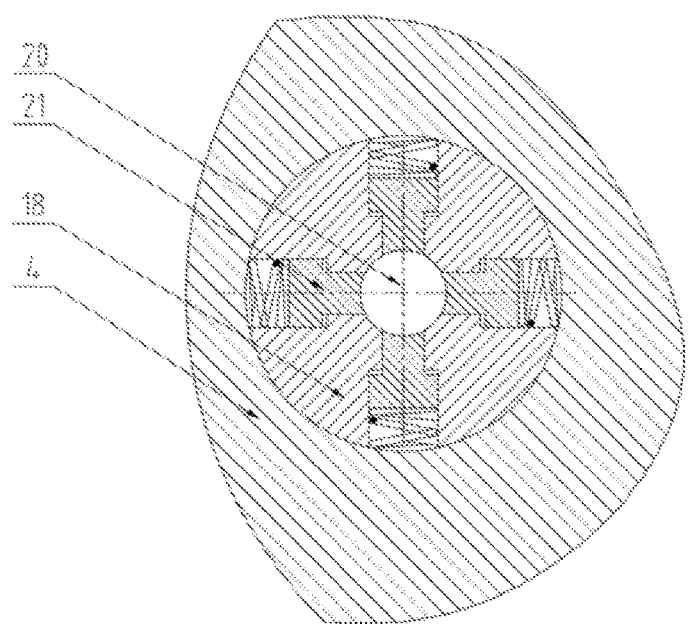
FIG. 3 is a top sectional view of each self-centering system of the self-centering device for the cylinder liner press-fit wheel of the present disclosure.
Figure 4:
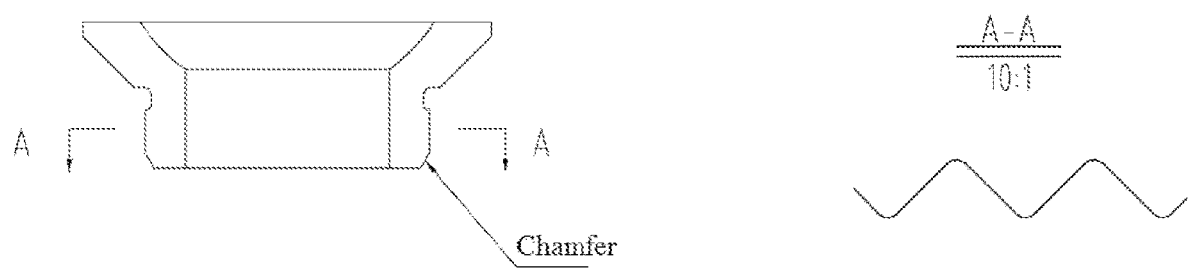
FIG. 4 is a schematic diagram of a cylinder liner of the self-centering device for the cylinder liner press-fit wheel of the present disclosure.

As shown in FIG. 2, the number of the self-centering systems and the number of the bolt holes of the wheel are the same, and the pitch diameter of the axes of a plurality of self-centering structures and the pitch diameter of the bolt holes of the wheel are the same.

In actual use, the wheel 5 is put onto the upper surfaces of the plurality of shaft sleeves 18 first, the positioning columns 20 of which the number is the same as that of the bolt holes penetrate through the bolt holes in the wheel 5 correspondingly to position the wheel 5, then the cylinder liners 19 of which the number is the same as that of the bolt holes are put at steps of the positioning columns 20, at the moment, the hydraulic cylinder 10 starts to press down to drive the plurality of hollow pressing columns 6 to press down, when chamfers of the cylinder liners 19 start to be in touch with the bolt holes in the wheel 5, if there is some slight offset between each cylinder liner 19 and the axis of the corresponding bolt hole, the four corresponding floating blocks 21 and the corresponding compression springs behind may push the corresponding positioning column 20 to move in the horizontal direction and drive the cylinder liner 19 to move to be coaxial with the bolt hole of the wheel, and the corresponding hollow pressing column 6 continuously presses down and at last presses the cylinder liner 19 in the bolt hole of the wheel coaxially.

In some embodiments, the four mechanisms of compression springs and the floating blocks 21 of the present disclosure may ensure the movement in any direction of the corresponding positioning column 20 in the horizontal plane, and the amount of movement may be designed according to comprehensive errors of the system. In the present disclosure, the amount of movement is designed to be 1 mm. When the comprehensive errors of the system are large, the amount of movement may be designed to be larger.

In some embodiments, the compression springs of the present disclosure may keep each positioning column 20 in a free state at the highest point within a whole vertical movement stroke space, and after once pressing is finished, the positioning columns 20 naturally return to the highest points.

Compared with the prior art, the self-centering device for the cylinder liner press-fit wheel has the following advantages:

The solution provided by the present disclosure may improve center alignment when cylinder liners are pressed in bolt holes of the wheel, may reduce rejects generated when bolt hole materials are pressed out by alignment failures, and may improve a press-fit yield.

In the description of the present invention, it should be understood that the terms "center", "longitudinal", "transverse", "front", "rear", "left", "right", "vertical", "horizontal", "top", "bottom", "inner", "outer", and the like indicate orientations or positional relationships based on the drawings. The terms are only for description convenience of the present invention and simplification of the description, but do not indicate or imply that the pointed apparatuses or elements must have specific orientations or be constructed and operated in specific orientations. Therefore, the terms should not be understood to limit the present invention.

Furthermore, the terms "first" and "second" are only for the aim of description, and cannot be understood as indicating or implying the relative importance or implicitly indicating the quantity of the indicated technical features. Thus, the features defined with "first" and "second" may explicitly or implicitly comprise one or more of these features. In the description of the present invention, "a plurality of" means at least two, e.g., two, three, etc., unless otherwise specified.

In the present invention, unless otherwise specified and defined, the terms "mounted", "joined", "connected", "fixed" and the like should be understood in a broad sense, for example, being fixedly connected, detachably connected, integrated; mechanically connected, electrically connected, mutually communicated; directly connected, indirectly connected by a medium, communication of interiors of two components or interaction of two components. A person of ordinary skill in the art could understand the specific meanings of the above terms in the present invention according to specific circumstances.

The foregoing descriptions are merely preferred embodiments of the present invention, but are not intended to limit the present invention. Any modification, equivalent substitution, improvement and the like made within the spirit and principle of the present invention shall fall within the protection scope of the present invention.

What is claimed is:

1. A self-centering device for a cylinder liner press-fit wheel, comprising a rack, wherein a bottom plate is disposed at the bottom of the rack, a top plate is disposed on the top of the rack, a flat plate is disposed on the bottom plate, self-centering systems are disposed on the flat plate, each self-centering system comprises a positioning column elastically connected to the flat plate, the positioning columns can move relative to the flat plate in an up-down direction, a left-right direction and a front-back direction, hydraulic cylinders are disposed on the top plate, and hollow pressing columns are connected downwards to output ends of the hydraulic cylinders at the positions corresponding to the positioning columns.

2. The self-centering device for the cylinder liner press-fit wheel according to claim 1, wherein each self-centering system comprises a shaft sleeve disposed on the flat plate, a positioning column is disposed in a gap in the middle of each shaft sleeve, and the bottom of each positioning column is connected to the corresponding shaft sleeve through compression springs.

3. The self-centering device for the cylinder liner press-fit wheel according to claim 2, wherein each positioning column is connected to the corresponding shaft sleeve through the compression springs in forwards, backwards, leftwards and rightwards directions correspondingly.

4. The self-centering device for the cylinder liner press-fit wheel according to claim 3, wherein a floating block is disposed between each positioning column and the corresponding compression spring.

5. The self-centering device for the cylinder liner press-fit wheel according to claim 4, wherein a cover plate is disposed on the lower portion of each shaft sleeve, and the bottom of each positioning column is connected to the corresponding cover plate through a corresponding compression spring.

6. The self-centering device for the cylinder liner press-fit wheel according to claim 5, wherein the bottom plate is fixedly connected to the flat plate through supports.

7. The self-centering device for the cylinder liner press-fit wheel according to claim 5, wherein the output ends of the hydraulic cylinders are fixedly connected to the hollow pressing columns through a connecting plate.

8. The self-centering device for the cylinder liner press-fit wheel according to claim 5, wherein the number of the self-centering systems and the number of the bolt holes of the wheel are matched.

9. The self-centering device for the cylinder liner press-fit wheel according to claim 8, wherein the number of the hollow pressing columns and the number of the self-centering systems are matched.

\* \* \* \* \*